US008551429B2

(12) United States Patent
Neuman et al.

(10) Patent No.: US 8,551,429 B2
(45) Date of Patent: Oct. 8, 2013

(54) METHODS OF PROCESSING POLYHALITE ORE, METHODS OF PRODUCING POTASSIUM SULFATE, AND RELATED SYSTEMS

(71) Applicant: Intercontinental Potash Corp. (USA), Hobbs, NM (US)

(72) Inventors: Thomas H. Neuman, Salt Lake City, UT (US); Richard W. Chastain, Carlsbad, NM (US); Donial M. Felton, Carlsbad, NM (US); Daniel C. Neuman, Soda Springs, ID (US); Otto C. Schnauber, Rock Springs, WY (US)

(73) Assignee: Intercontinental Potash Corp. (USA), Hobbs, NM (US)

( * ) Notice: Subject to any disclaimer, the term of this patent is extended or adjusted under 35 U.S.C. 154(b) by 0 days.

(21) Appl. No.: 13/670,170

(22) Filed: Nov. 6, 2012

(65) Prior Publication Data

US 2013/0121900 A1 May 16, 2013

Related U.S. Application Data

(60) Provisional application No. 61/559,488, filed on Nov. 14, 2011.

(51) Int. Cl.
*B01D 9/02* (2006.01)
*B01J 19/00* (2006.01)
*C01D 5/00* (2006.01)

(52) U.S. Cl.
USPC .......... 423/199; 423/551; 23/302 R; 422/129; 422/187; 422/245.1

(58) Field of Classification Search
USPC ......... 423/199, 551; 23/302 R; 422/129, 187, 422/245.1
See application file for complete search history.

(56) References Cited

U.S. PATENT DOCUMENTS

| | | | |
|---|---|---|---|
| 1,794,552 A * | 3/1931 | Schoch | 423/158 |
| 1,812,497 A * | 6/1931 | Ransom | 423/189 |
| 1,924,519 A * | 8/1933 | Schoch | 423/199 |
| 1,952,289 A * | 3/1934 | Schoch | 423/195 |
| 2,020,322 A * | 11/1935 | Lambert | 423/187 |
| 2,033,149 A | 3/1936 | Partridge et al. | |
| 2,862,788 A | 12/1958 | Stanley, Jr. et al. | |
| 2,895,794 A | 7/1959 | Dancy, Jr. et al. | |
| 2,902,334 A | 9/1959 | Milne | |
| 3,004,826 A | 10/1961 | Marullo et al. | |
| 3,058,806 A | 10/1962 | Ebner | |
| 3,110,561 A | 11/1963 | Henne et al. | |
| 3,203,757 A | 8/1965 | Henne et al. | |
| 3,271,106 A | 9/1966 | Nylander | |
| 3,475,132 A | 10/1969 | Seifert et al. | |
| 3,528,767 A | 9/1970 | Garrett | |
| 3,617,243 A | 11/1971 | Neitzel | |
| 3,630,713 A | 12/1971 | Adams et al. | |
| 3,634,041 A | 1/1972 | Ryan et al. | |
| 3,843,772 A | 10/1974 | Boeglin | |
| 3,926,609 A | 12/1975 | Effmert et al. | |
| 4,026,696 A | 5/1977 | Young | |
| 4,045,335 A | 8/1977 | Adams et al. | |
| 4,183,738 A | 1/1980 | Carmon | |
| 4,246,019 A | 1/1981 | Sokolov et al. | |
| 4,277,253 A | 7/1981 | Walter et al. | |
| 4,306,880 A | 12/1981 | Garrett | |
| 4,500,336 A | 2/1985 | Van Hijfte et al. | |
| 4,533,536 A | 8/1985 | Bichara et al. | |
| 4,554,151 A | 11/1985 | Worthington et al. | |
| 4,815,790 A | 3/1989 | Rosar | |
| 5,057,208 A | 10/1991 | Hagedorn et al. | |
| 5,078,779 A | 1/1992 | Van de Walle et al. | |
| 5,102,441 A | 4/1992 | Zentgraf et al. | |
| 5,246,273 A | 9/1993 | Rosar | |
| 6,013,209 A | 1/2000 | Phinney | |
| 6,582,637 B1 | 6/2003 | Phinney | |
| 6,709,685 B1 | 3/2004 | van Brempt et al. | |
| 2006/0032114 A1 | 2/2006 | Krysiak et al. | |
| 2006/0226051 A1 | 10/2006 | Navarrette et al. | |
| 2010/0031719 A1 | 2/2010 | Hero et al. | |
| 2010/0066153 A1 | 3/2010 | Day et al. | |

FOREIGN PATENT DOCUMENTS

GB 1 183 938 3/1970
WO 2010-150267 A1 12/2010

OTHER PUBLICATIONS

Felton, et al., "Producing Sulfate of Potash from Polyhalite with Cost Estmates," Gustavson Associates, Mar. 23, 2010, pp. 1-19.
Fragen, et al., "Extraction of Potash from Polyhalite," Industrial and Engineering Chemistry, Oct. 1933, vol. 25, No. 10, pp. 1153-1160.
PCT International Search Report and Written Opinion of the International Searching Authority for PCT/US2012/063687, dated Mar. 18, 2013, 11 pages.
Conley et al., "Potash Salt from Texas New Mexico Polyhalite Deposits: Commercial Possibilities, Proposed Technology, and Pertinent Salt Solution Equilibria," U.S. Dept. of the Interior, Bulletin 459, Washington, DC, 1944, pp. i-251.
Wollmann et al., "Heat of solution of polyhalite and its analogues at T = 298.15 K," J. Chem. Thermodynamics, 41 (2009) 484-488.

* cited by examiner

*Primary Examiner* — Timothy Vanoy
(74) *Attorney, Agent, or Firm* — TraskBritt

(57) ABSTRACT

Methods of forming potassium sulfate include calcining polyhalite ore particles to convert the polyhalite ore particles to a water-soluble composition. At least a portion of the water-soluble composition is dissolved in an aqueous medium to form an aqueous solution comprising $K^+$, $Mg^{2+}$, and $SO_4^{2-}$ ions and a calcium-containing solid. The calcium-containing solid is separated from the aqueous solution to form a filtrate comprising $K^+$, $Mg^{2+}$, and $SO_4^{2-}$ ions. A potassium-containing salt is dissolved in the filtrate to increase the concentration of $K^+$ and $SO_4^{2-}$ ions to from a concentrated liquor, and $K_2SO_4$ is crystallized from the concentrated liquor. A system for processing polyhalite ore includes a countercurrent leaching apparatus, a first mix tank, an evaporator, and at least one crystallizer.

21 Claims, 4 Drawing Sheets

METHODS OF PROCESSING POLYHALITE ORE, METHODS OF PRODUCING POTASSIUM SULFATE, AND RELATED SYSTEMS

CROSS-REFERENCE TO RELATED APPLICATION

This application claims the benefit of U.S. Provisional Patent Application Ser. No. 61/559,488, filed Nov. 14, 2011, in the name of Chastain et al., the disclosure of which is hereby incorporated herein in its entirety by this reference.

FIELD

The present disclosure relates generally to processing polyhalite ore to produce sulfate of potash, langbeinite, and/or other products.

BACKGROUND

Polyhalite is a mineral having the formula $K_2Ca_2Mg(SO_4)_4.2H_2O$, which occurs naturally in, for example, deposits in Texas, New Mexico, Ukraine, and Germany. Ore deposits are conventionally sub-surface mined to produce ore in rock or chunk form because polyhalite is not sufficiently water-soluble to allow ore deposits to be economically solution mined.

Polyhalite may be used in the production of various salts, such as potassium sulfate (also known as sulfate of potash or SOP), potassium magnesium sulfate, potassium calcium sulfate, potassium hydroxide, magnesium sulfate, etc. Some potassium salts are important ingredients in fertilizers and feedstocks for various industrial processes.

Polyhalite is soluble or leachable in aqueous solutions without calcining (i.e., heating to a temperature at which the polyhalite at least partially dissociates), but dissolution is relatively slow. Several methods of processing polyhalite ores are known, such as those described in John E. Conley and Everett P. Partridge, "Potash Salt from Texas-New Mexico Polyhalite Deposits: Commercial Possibilities, Proposed Technology, and Pertinent Salt-Solution Equilibria," U.S. Dept. of the Interior Bureau of Mines Bulletin 459 (1944), which is incorporated herein in its entirety by this reference. For example, polyhalite may be calcined by methods known in the art, and $K_2SO_4$ and $MgSO_4$ may be extracted by hot water, cold water, or other methods. The resulting liquor may be subjected to various processes in order to yield products such as potassium sulfate (SOP or $K_2SO_4$), leonite ($K_2SO_4MgSO_4.4H_2O$), schoenite ($K_2SO_4MgSO_4.6H_2O$), langbeinite ($K_2SO_4.2MgSO_4$), kieserite ($MgSO_4.H_2O$), epsomite ($MgSO_4.7H_2O$), etc.

Known methods of processing polyhalite ores generally require significant power and/or steam inputs, and may have process limitations. For example, in some processes, $K_2SO_4$ may be recovered with an efficiency of about 86%, but may not be in the form conventionally used as fertilizer (e.g., crystalline form, purity, etc.). In some processes, potassium may be produced entirely as SOP, but the efficiency may be only about 74%, and steam and power requirements may be relatively higher. In still other processes, $K_2SO_4$ efficiency may be as high as 95%, but with higher steam and power requirements. Some processes may yield sulfate-containing products in less-than-ideal ratios (i.e., in ratios that do not maximize economic value of products). It would therefore be advantageous to provide a method of processing polyhalite that minimizes or alleviates these shortcomings.

BRIEF SUMMARY

In some embodiments of the disclosure, a method of forming potassium sulfate includes calcining polyhalite ore particles to convert the polyhalite ore particles to a water-soluble composition. At least a portion of the water-soluble composition is dissolved in an aqueous medium to form an aqueous solution comprising $K^+$, $Mg^{2+}$, and $SO_4^{2-}$ ions and a calcium-containing solid. The calcium-containing solid is separated from the aqueous solution to form a filtrate comprising $K^+$, $Mg^{2+}$, and $SO_4^{2-}$ ions. A potassium-containing salt is dissolved in the filtrate to increase the concentration of $K^+$ and $SO_4^{2-}$ ions to form a concentrated liquor, and $K_2SO_4$ is crystallized from the concentrated liquor.

In other embodiments, a method of producing potassium sulfate includes providing a calcined polyhalite ore, leaching the calcined polyhalite ore to produce a liquor comprising potassium sulfate and magnesium sulfate, dissolving a potassium-rich salt in the liquor to increase the concentration of potassium sulfate to form a concentrated liquor, and crystallizing potassium sulfate from the concentrated liquor.

In particular embodiments, a system for processing polyhalite ore includes a countercurrent leaching apparatus, a first mix tank, an evaporator, and at least one crystallizer. The countercurrent leaching apparatus is structured and adapted to leach potassium sulfate and magnesium sulfate from calcined polyhalite ore to form an extract liquor. The first mix tank, in fluid communication with the leaching apparatus, is structured and adapted to mix a potassium-rich salt with the extract liquor to form a concentrated liquor. The evaporator, in fluid communication with the first mix tank, is structured and adapted to evaporate water from the concentrated liquor and remove a calcium-containing compound therefrom. The crystallizer, in fluid communication with the evaporator, is structured and adapted to precipitate at least one of potassium sulfate, leonite, or langbeinite from the concentrated liquor.

BRIEF DESCRIPTION OF THE DRAWINGS

While the specification concludes with claims particularly pointing out and distinctly claiming what are regarded as embodiments of the present disclosure, various features and advantages of embodiments of the present disclosure may be more readily ascertained from the following description of some embodiments of the present disclosure when read in conjunction with the accompanying drawings, in which:

DETAILED DESCRIPTION

Novel systems and processes for processing polyhalite are described herein. The processes may include, for example, steps for grinding, calcining, leaching, dissolving, concentrating, crystallizing, and physical separation (e.g., filtration), as described in further detail below. Illustrations presented herein are representations employed to describe embodiments of the present disclosure.

As used herein, particular mineral names (e.g., polyhalite, leonite, langbeinite, etc.) may refer to as-mined minerals, minerals physically or chemically separated from as-mined minerals, or crystallized solids formed (e.g., crystallized) in industrial processes. Particular minerals described herein may be substantially pure or may be mixed with other materials or contaminants.

Figure 1:
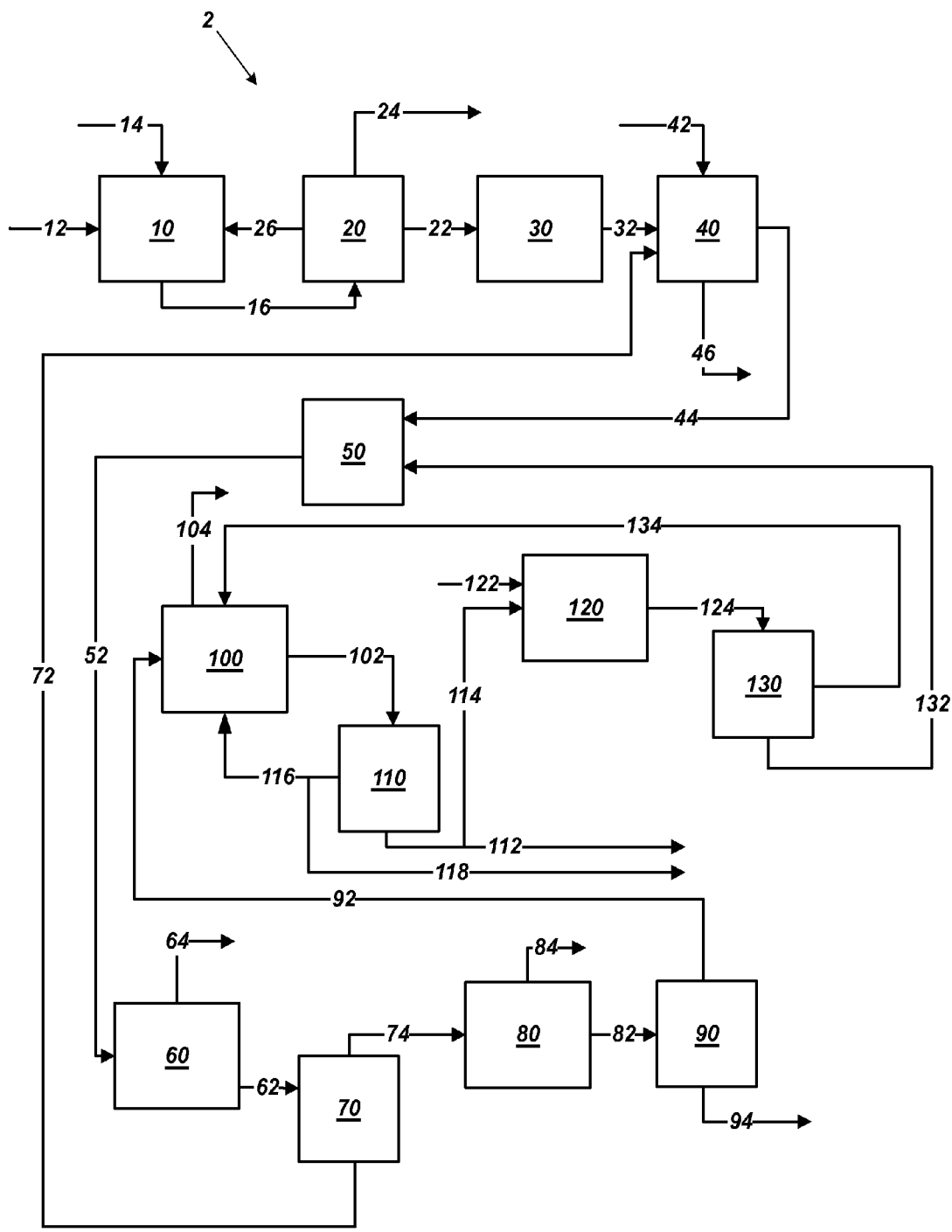
FIG. 1 is a simplified block flow diagram illustrating an embodiment of a system and process for producing SOP and langbeinite from polyhalite.

A system for processing polyhalite (system 2) is shown schematically in FIG. 1. To simplify the figures and clarify the present disclosure, not every element or component of system 2 is shown or described herein. System 2 may also include appropriate piping, connectors, sensors, controllers, etc., as will be understood by those of ordinary skill in the art. System 2 may include a grinding apparatus 10 for grinding or comminuting a polyhalite ore 12 in as-mined rock form. For example, the mined polyhalite ore 12, partially crushed by a breaker-feeder, may be mixed with an aqueous medium 14 (e.g., groundwater, river water, a dilute NaCl brine, etc.) in a rod mill or impactor to wash and grind the polyhalite ore 12, producing a slurry 16. Grinding may continue until the polyhalite ore 12 reaches a selected size distribution, based on preferred operating parameters of the system 2. For example, the slurry 16 may contain a solids distribution in which the solid mass passes through a Tyler Mesh #10 screen. Material that does not pass through the screen may be recycled through the grinding apparatus 10. In some embodiments, the mined polyhalite ore 12 may be ground in another grinding operation, such as a ball mill, a cage mill, an autogenous mill, a semi-autogenous grinding mill, etc. The polyhalite ore 12 may be washed before, during, or after grinding. In some embodiments, the polyhalite ore 12 may not be washed at all, though washing may help control dusting and may remove some soluble salts (e.g., sodium chloride) from the solid polyhalite ore 12. Washing (either during or subsequent to grinding) and removal of soluble salts may be beneficial for process control because concentrations of soluble salts in incoming polyhalite ore 12 may vary. Removal of soluble salts may limit variations in subsequent processing. However, if a dilute NaCl brine is used as wash water, some additional NaCl may occlude to the ground ore particles. Furthermore, if such salts are desired in an end product or in processing steps, they may be added back into the process as desired. Adding soluble salts back into a processed ore may be advantageous because the concentration of such salts may be controlled.

The slurry 16 may be dewatered in a solid-liquid separator 20, such as a filter, centrifuge, a settling tank, a cyclone separator, etc. Washed polyhalite particles 22 may be separated from a brine purge 24 and a brine recycle 26. The washed polyhalite particles 22 may be fed to a calciner 30, whereas the brine recycle 26 may return to the grinding apparatus 10. The brine recycle 26 may increase the concentration of sodium chloride (NaCl) in the grinding apparatus 10 to a design specification, such as to about 20%, about 50%, or about 75% by weight of the liquid. The brine purge 24 may flow to a waste treatment facility (e.g., an evaporation pond), and removal of the brine purge 24 may control the sodium chloride concentration in the grinding apparatus 10. For example, increasing the flow rate of the brine purge 24 may decrease the sodium chloride concentration in the slurry 16. The washed polyhalite particles 22 may have a low moisture content, and therefore, a low sodium chloride concentration. In some embodiments, the washed polyhalite particles 22 may be further washed in a fresh water wash (not shown) to further decrease the sodium chloride concentration of the washed polyhalite particles 22.

The washed polyhalite particles 22 from the solid-liquid separator 20 may be heated in the calciner 30 to cause phase transitions, producing a calcined polyhalite 32. Calcination is described in John E. Conley and Everett P. Partridge, "Potash Salt from Texas-New Mexico Polyhalite Deposits: Commercial Possibilities, Proposed Technology, and Pertinent Salt-Solution Equilibria," U.S. Dept. of the Interior Bureau of Mines Bulletin 459 (1944), previously incorporated by reference. In order for the washed polyhalite particles 22 to be leachable, the washed polyhalite particles 22 may be subjected to a temperature in a range from about 440° C. to about 540° C., such as from about 480° C. to about 520° C. In addition to a selected or predetermined calcining temperature, the time at the calcining temperature may at least partially determine the leachability of the calcined polyhalite 32. For example, the washed polyhalite particles 22 may be subjected to a calcining temperature for an average residence time from about 1 minute to about 60 minutes. In other embodiments, the average residence time may be maintained for about 10 minutes to about 15 minutes. The calciner 30 may be, for example, a fluidized-bed calciner, a flash calciner, or a rotary kiln.

The calcined polyhalite 32, now in a water-soluble form or condition, may enter a leach circuit 40, where the calcined polyhalite 32 may be mixed with an aqueous solvent 42 and, optionally, a solid recycle 72 (which may contain calcium-containing compounds, such as polyhalite, syngenite ($K_2SO_4.CaSO_4.H_2O$), pentasalt ($K_2SO_4.5CaSO_4.H_2O$), etc.) to produce an extract liquor 44 and tailings 46 (which may include anhydrite ($CaSO_4$), magnesite ($MgCO_3$), and/or other insoluble materials). The leach circuit 40, enclosed by dashed lines, may separate potassium and magnesium from calcium salts by exposing the calcined polyhalite 32 to the aqueous solvent 42 having a temperature at or near the boiling point of the aqueous solvent 42.

Figure 2:
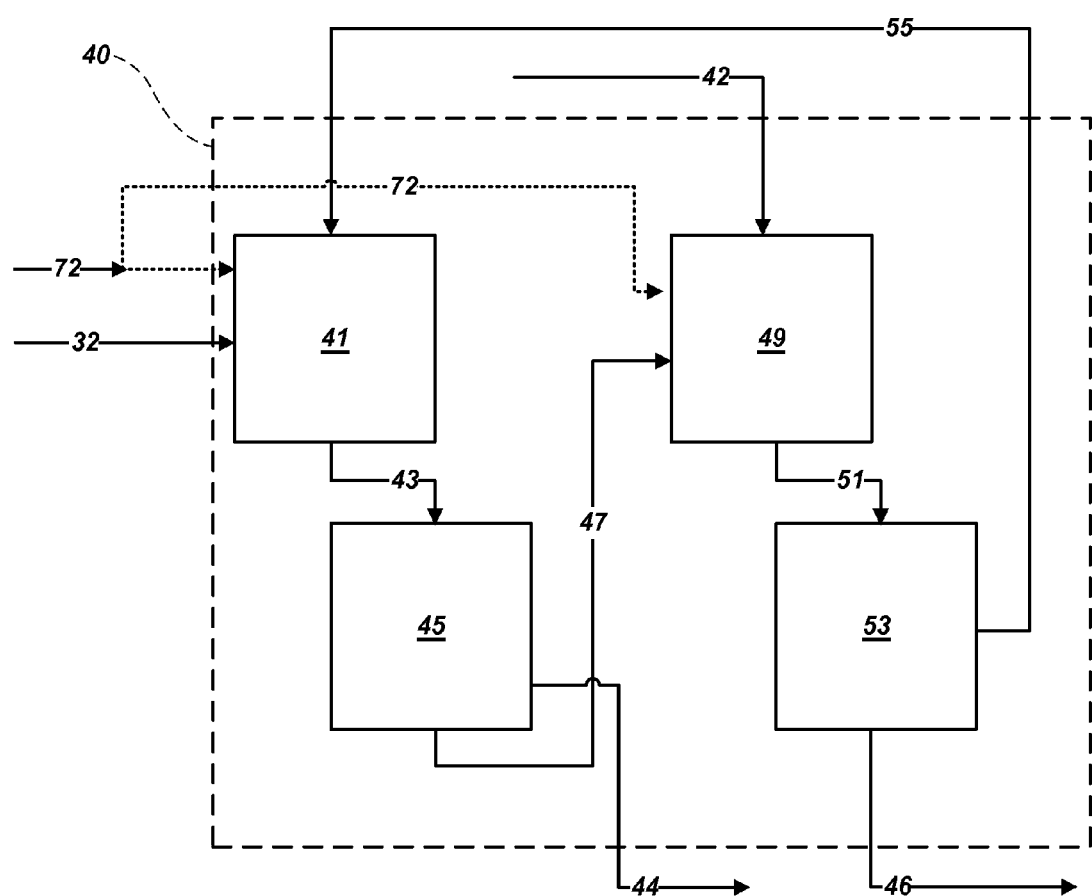
FIG. 2 is a simplified block flow diagram illustrating an embodiment of a leaching system and process that may be used in conjunction with the system and process of FIG. 1.

As shown in FIG. 2, the leach circuit 40 may include a first leach stage 41, a solid-liquid separator 45, a second leach stage 49, and another solid-liquid separator 53. The first leach stage 41 may be a countercurrent system operating at or near atmospheric boiling. Depending on the composition of the solid recycle 72, the solid recycle 72 may be added to either the first leach stage 41 (with the calcined polyhalite 32) or to the second leach stage 49, as indicated by alternative dotted lines. The calcined polyhalite 32 may have an average residence time in the first leach stage 41 from about 5 minutes to about 180 minutes, such as from about 30 minutes to about 90 minutes. In some embodiments, the average residence time in the first leach stage 41 may be about 60 minutes. In some embodiments, the leach circuit may operate at temperatures from about 80° C. to about 120° C., such as from about 90° C. to about 100° C. A slurry 43 leaving the first leach stage 41 may be separated in the solid-liquid separator 45 (e.g., a centrifuge, a settling tank, a cyclone separator, etc), producing the extract liquor 44 and solids 47. The solids 47 may enter the second leach stage 49, which may also be a countercurrent system operating at or near boiling. Aqueous solvent 42 may flow through the second leach stage 49, forming a slurry 51. The average residence time in the second leach stage 49 may be, for example, approximately the same as the average residence time in the first leach stage 41. In some embodiments, the leach stages 41, 49 may have different average residence times. The slurry 51 may be separated in the solid-liquid separator 53 (e.g., a centrifuge, a settling tank, a cyclone separator, etc.), producing a weak liquor 55 and the tailings 46. The weak liquor 55 may be recycled to the first leach stage 41. The tailings 46 may be transferred to a storage impoundment (e.g., a pond, a tank, etc.) for treatment and/or disposal.

The leach circuit 40 may, in some embodiments, include a single leach stage. In other embodiments, such as shown in FIG. 2, the leach circuit 40 may include two or more leach stages. The leach stages may be operated with countercurrent or cocurrent flow. In some embodiments, sodium salts may be added to the leach circuit 40. Sodium ions ($Na^+$) may slow reversion of materials in the leach circuit 40 back to insoluble polyhalite. However, sodium salts may not be desirable in some products, so the addition of sodium may warrant further separation. The benefits of sodium ions in the leach circuit 40 should be weighed against the costs of later separation or the costs of sodium contamination in products. In some embodiments, sodium salts may not be added to the leach circuit 40. In embodiments in which sodium salts are added to the leach circuit 40, at least a portion of the brine purge 24 may be added to the leach circuit 40.

The leach circuit 40 may be designed to precipitate calcium-containing sulfate compounds (e.g., anhydrite, etc.) from solution. The solubility of calcium sulfate decreases with increasing temperatures and with increasing concentrations of potassium ($K^+$) and magnesium ($Mg^{2+}$) ions. By raising the temperature in the leach circuit 40, the concentration of potassium and magnesium ions increases, which, in combination with the higher temperature, may cause a decrease in the solubility of, and therefore precipitation of, calcium sulfate. The calcium-containing sulfate compounds may then be separated by solid-liquid separation mechanisms. Freeing the extract liquor 44 from calcium ions ($Ca^{2+}$) may limit or prevent problems with scale in subsequent operations. In some embodiments, the leach circuit 40 may operate at temperatures from about 80° C. to about 120° C., such as from about 90° C. to about 100° C.

Referring back to FIG. 1 and with continued reference to FIG. 2, the extract liquor 44 from the leach circuit 40 may enter a dissolver 50, where the extract liquor 44 may be mixed with solids 132. The solids 132 may include leonite and/or schoenite, plus trace amounts of other solids. The solids 132 may be recycled from subsequent processes, as described below. The solids 132 may at least partially dissolve in the extract liquor 44, which may increase the concentration of both potassium and magnesium ions in the resulting thick liquor 52. The dissolver 50 may be held at a temperature from about 70° C. to about 130° C. to promote the dissolution of leonite. For example, the dissolver 50 may operate at a temperature of about 80° C. In some embodiments, the dissolver 50 may operate at or above a saturation temperature of the thick liquor 52 (e.g., at or above 115° C.). Increasing the concentration of potassium and magnesium ions in the thick liquor 52 before evaporating liquids may be beneficial to decrease capital costs and/or operating costs associated with evaporation. Furthermore, adding solids 132 in the dissolver 50 may dilute undesirable contaminants, such as calcium sulfate and sodium chloride.

The thick liquor 52 may enter an evaporator 60 to further reduce calcium solubility, forming a slurry 62 and removing water vapor 64. A solid-liquid separator 70 may separate the slurry 62 into a solid recycle 72 and a concentrated SOP liquor 74. The solid recycle 72 may contain syngenite, anhydrite, and/or polyhalite. The evaporator 60 may be, for example, a mechanical vapor recompression (MVR) evaporator operable to remove from about 10 wt % to about 50 wt %, from about 20 wt % to about 40 wt %, or from about 25 wt % to about 35 wt % of the water from the thick liquor 52. In some embodiments, the evaporator 60 may remove about 30 wt % of the water from the thick liquor 52. The evaporator 60 may operate at temperatures from about 80° C. to about 120° C., such as from about 95° C. to about 100° C. In some embodiments, a small amount of cooling may precipitate calcium-containing species in a removable form, such as for recycling or disposal. The concentration of one or more components of the thick liquor 52 may be above the saturation point, causing precipitation of solid components of the solid recycle 72. Removal of the solid recycle 72 from the concentrated SOP liquor 74 may reduce the calcium concentration in the concentrated SOP liquor 74. Such removal may limit problems with scale in subsequent operations and may allow higher product yield by recycling undissolved and/or recrystallized polyhalite.

The concentrated SOP liquor 74 may enter a first crystallizer 80 after leaving the solid-liquid separator 70. The first crystallizer 80 may be operable to produce a slurry 82 by removing additional water as vapor 84. The slurry 82 may include, for example, crystalline SOP and dissolved salts (e.g., dissolved SOP, dissolved magnesium sulfate, etc.). The first crystallizer 80 may be an MVR evaporator, and may operate at a lower temperature than the evaporator 60, such as in a temperature range from about 70° to about 100° C., from about 80° C. to about 90° C., or at about 85° C. The first crystallizer 80 may remove approximately 30% of the water from the concentrated SOP liquor 74 in the form of the vapor 84.

The slurry 82 may enter a solid-liquid separator 90 (e.g., a centrifuge, a settling tank, a cyclone separator, etc.), which may produce an SOP mother liquor 92 and SOP solids 94. The SOP solids 94 contain some water, and may be processed in drying and/or granulation operations (not shown) to produce SOP (which may contain some other materials, such as syngenite, trace amounts of sodium chloride, calcium sulfate, etc.). The SOP mother liquor 92 may contain dissolved magnesium sulfate, dissolved SOP, and minor amounts of sodium chloride and/or calcium sulfate (e.g., sodium chloride and calcium sulfate may comprise less than about 2% of the total dissolved solids).

The SOP mother liquor 92 may enter a second crystallizer 100. The second crystallizer 100 may produce a slurry 102 by removing water as vapor 104. The slurry 102 may include, for example, langbeinite, kieserite, leonite, schoenite, SOP, and/or dissolved salts (e.g., dissolved SOP, dissolved magnesium sulfate, etc.). The second crystallizer 100 may be an MVR evaporator, and may operate at a higher temperature than the first crystallizer 80, such as in a temperature range from about 80° C. to about 120° C., from about 90° C. to about 110° C., or at about 100° C. The second crystallizer 100 may remove from about 30 wt % to about 70 wt % of the water from the SOP mother liquor 92 in the form of the vapor 104. In processing the SOP mother liquor 92, one or more multiple-effect evaporators (MEEs) may be utilized instead of, or in addition to, MVR evaporators. Different temperatures and flow conditions may be required.

The slurry 102 may enter a solid-liquid separator 110 (e.g., a centrifuge, a settling tank, a cyclone separator, etc.), which may separate solids 112, 114 from liquids 116, 118. The solids 112, 114 may also contain some water. A first portion of solids 112 may optionally be removed from the system 2 for processing in drying and/or granulation operations to produce langbeinite (which may contain some other materials, such as trace amounts of sodium chloride, calcium sulfate, etc.). The liquids 116, 118 may contain primarily dissolved magnesium sulfate, with minor amounts of SOP, sodium chloride, and/or calcium sulfate (e.g., SOP, sodium chloride, and calcium sulfate may comprise less than about 25% of the total dissolved solids). A first portion of liquid 116 may be recycled back into the second crystallizer 100 to recover magnesium sulfate. A second portion of liquid 118 may be transferred to a storage impoundment for treatment and/or disposal. Removal of the second portion of liquid 118 may limit or prevent accumulation of liquor impurities, such as sodium chloride, in the second crystallizer 100. Approximately 20% of the liquids may be removed from the system 2 in liquid stream 118, while the remaining approximately 80% of the liquids may be recycled to the second crystallizer 100 in liquid stream 116. In some embodiments, the liquid stream 118 may be subsequently processed to recover magnesium sulfate.

All or a portion (e.g., approximately 85%) of the solids may be transferred to a decomposer 120 as solids stream 114. The remaining portion, if any, (e.g., approximately 15%) of the solids (solids stream 112) may be processed in drying and/or granulation operations to produce langbeinite (which may contain some other materials, such as syngenite, trace amounts of sodium chloride, calcium sulfate, etc.).

The solids stream 114 may be combined with make-up water 122 in the decomposer 120 to form a slurry 124. The decomposer 120 may be, for example, an agitated tank system operating at a temperature below the operating temperatures of the first crystallizer 80 and the second crystallizer 100. In some embodiments, the decomposer 120 may operate at a temperature from about 40° C. to about 80° C., from about 50° C. to about 70° C., or at approximately 60° C. In the decomposer 120, the ratio of the dissolution rates of magnesium sulfate to potassium sulfate from the langbeinite crystals of the solids stream 114 may be higher than the stoichiometric ratio of those sulfates than the langbeinite, thereby decomposing langbeinite to leonite. In other words, more magnesium sulfate (on a molar basis) than potassium sulfate may be dissolved from langbeinite. Langbeinite ($K_2SO_4.2MgSO_4$), which has a ratio of 1 mole of $K_2SO_4$ to 2 moles of $MgSO_4$, may form leonite ($K_2SO_4.MgSO_4.4H_2O$), which has a ratio of 1 mole of $K_2SO_4$ to 1 mole of $MgSO_4$, as magnesium sulfate is dissolved (the transformation may also incorporate water molecules into the crystalline structure). The slurry 124 may therefore contain crystalline leonite, dissolved potassium sulfate, and dissolved magnesium sulfate. The slurry 124 may also contain small amounts of crystalline syngenite, crystalline langbeinite, dissolved sodium chloride, and/or dissolved calcium sulfate.

The slurry 124 may be separated into components in a solid-liquid separator 130 (e.g., a centrifuge, a settling tank, a cyclone separator, etc.), forming solids 132 and liquid 134. The solids 132 may be recycled to the dissolver 50, as described above. The liquid 134 (which may contain primarily magnesium sulfate) may be recycled to the second crystallizer 100.

The system 2 may include other elements or components not shown in FIG. 1 or 2. For example, the system 2 may include material handling equipment, such as pumps, augers, tilt tables, tanks, piping, sensors, valves, controllers, etc. The system 2 may be controlled by one or more computers (not shown), such as a programmable logic controller (PLC). A computer may detect operating conditions of the system 2 via one or more sensors (not shown) and adjust the flow of materials into, out of, or within the system 2 accordingly. The system 2 may alternatively or additionally be controlled by one or more human operators. Though shown as a continuous-flow operation, the system 2 may also be configured to operate in batch mode, as will be understood by a person having ordinary skill in the art.

The following example serves to explain embodiments of the present disclosure in more detail. This example is not to be construed as being exhaustive or exclusive as to the scope of this disclosure.

EXAMPLE

Processing of Polyhalite Ore

Polyhalite ore is extracted from deposits in New Mexico's Permian Basin by conventional mining techniques. Polyhalite ore is reduced to a grain size smaller than about 1.0 inch (25.4 mm) in diameter in a pre-crusher, then ground in a wet rod mill or gage mill operating in closed circuit with brackish groundwater from the Capitan Reef. Approximately 15% of the ore passes through a Tyler Mesh #10 screen after one pass through the mill; the remainder of the ore is recycled through the mill until it passes through the screen. The ground ore is dewatered in a centrifuge, and the liquor is returned to the mill. A portion of the liquor is purged to control sodium chloride concentration in the mill. The wet ore is transferred to a calciner for thermal treatment. The wet ore is heated to a temperature of between about 480° C. and 520° C. for a time period from about 5 minutes to about 15 minutes to increase leachability. The calcined ore is then cooled and transferred to a leach circuit.

Figure 3:
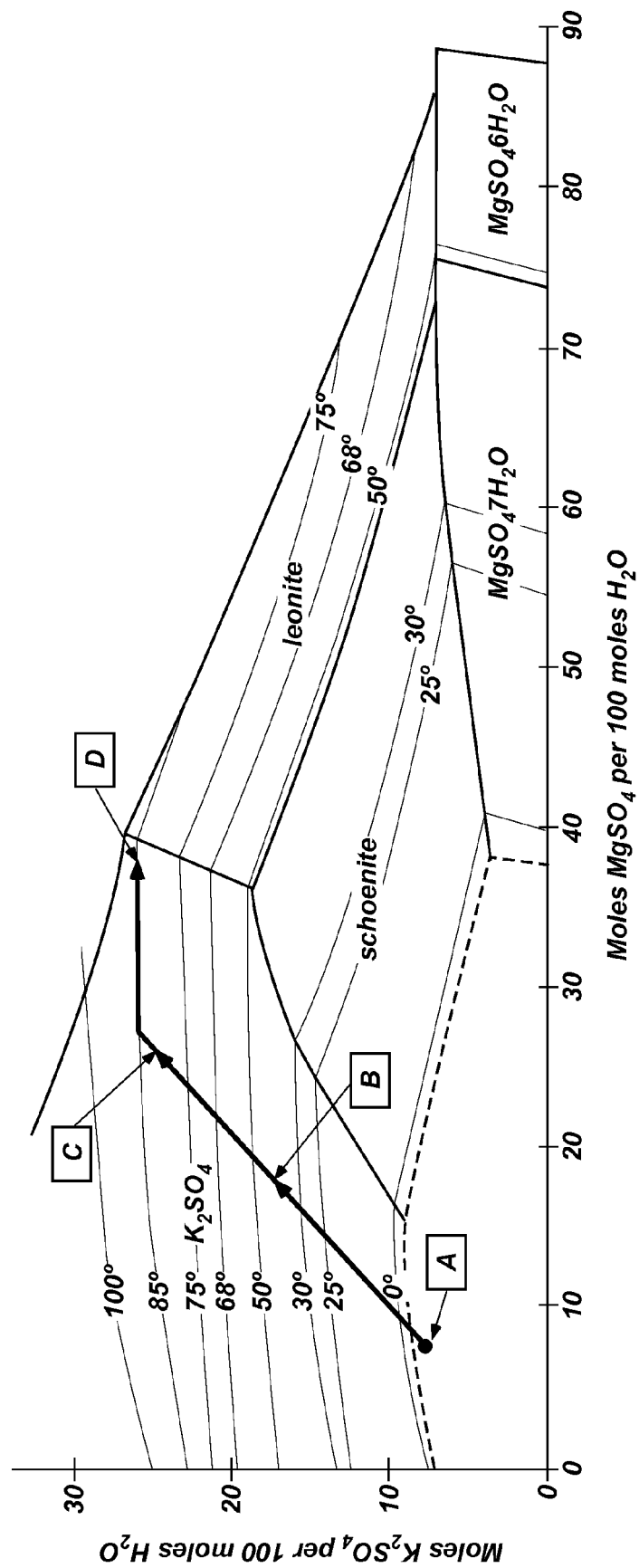
FIGS. 3 and 4 are phase diagrams illustrating compositions of solutions in an embodiment of a leaching system and process that may be used in conjunction with the system and process of FIG. 1.

The calcined ore is leached in a two-stage, countercurrent system, such as that disclosed above and in FIG. 2, operating at about 95° C. with an average retention time of approximately 60 minutes in the first stage and 180 minutes in the second stage. Solid-liquid separation equipment allows for passage of solids and liquids in opposite directions through the leach circuit. Water is added to the second leach stage and the resulting liquor from the second stage passes to the first leach stage. The calcined, cooled ore is added to the first leach stage, and solids remaining after the first leach stage are transferred to the second leach stage. Solids, containing primarily calcium sulfates (e.g., anhydrite) with smaller amounts of other calcium-containing salts (e.g., syngenite, polyhalite, pentasalt, etc.), are extracted from the second leach stage. Such solids may be present at equilibrium conditions with dissolved species, as described in John E. Conley and Everett P. Partridge, "Potash Salt from Texas-New Mexico Polyhalite Deposits: Commercial Possibilities, Proposed Technology, and Pertinent Salt-Solution Equilibria," U.S. Dept. of the Interior Bureau of Mines Bulletin 459 (1944), p. 112, previously incorporated by reference. Conditions for the leaching system may be selected to optimize recovery of one or more species (e.g., based on economic considerations, total product recovery, etc.). An extract liquor having concentrations of dissolved salts approximately as shown in Table 1 is extracted from the first leach stage. The material is also shown as point A on the phase diagram for $MgSO_4$, $K_2SO_4$, and water, as shown in FIG. 3. The horizontal axis of the phase diagram in FIG. 3 represents the molar concentration of $MgSO_4$ in solution, and the vertical axis represents the molar concentration of $K_2SO_4$ in solution.

TABLE 1

Extract Liquor Composition

| Compound | Wt % | g/100 g $H_2O$ | mol/1000 mol $H_2O$ |
|---|---|---|---|
| $K_2SO_4$ | 5.75 | 6.50 | 6.71 |
| $MgSO_4$ | 3.97 | 4.49 | 6.71 |
| NaCl | 0.36 | 0.41 | 1.26 |
| $CaSO_4$ | 0.17 | 0.19 | 0.25 |

The extract liquor is transferred to a dissolver and mixed with leonite solids (although other potassium-containing salts may be present) to increase the concentration of potassium and magnesium sulfates in solution. The dissolver is maintained at a temperature of at least 80° C. Adding leonite solids recovers potassium, increases liquor strength while maintaining a 1:1 mole ratio of potassium to magnesium, and decreases the solubility of undesired calcium salts. The composition of the resulting thick liquor is approximately as shown in Table 2 below and as point B on the phase diagram shown in FIG. 3.

TABLE 2

Thick Liquor Composition

| Compound | Wt % | g/100 g $H_2O$ | mol/1000 mol $H_2O$ |
|---|---|---|---|
| $K_2SO_4$ | 12.0 | 15.5 | 16.1 |
| $MgSO_4$ | 8.29 | 10.7 | 16.0 |
| NaCl | 0.30 | 0.39 | 1.21 |
| $CaSO_4$ | 0.15 | 0.20 | 0.26 |

The thick liquor is transferred to an MVR evaporator to increase the concentration of $K_2SO_4$ and $MgSO_4$, which may reduce the concentration of calcium in solution by precipitating calcium-containing species. The evaporator system operates between about 95° C. and about 120° C., and removes about 30 wt % of the water from the thick liquor. The precipitated polyhalite is separated by solid-liquid separation means and recycled to the leach circuit. The concentration of $CaSO_4$ in the concentrated SOP liquor is much lower with respect to $K_2SO_4$ than in the thick liquor; low $CaSO_4$ concentration may be important to maintain product quality of SOP. The composition of the resulting concentrated SOP liquor is approximately as shown in Table 3 below and as point C on the phase diagram shown in FIG. 3.

TABLE 3

Concentrated SOP Liquor Composition

| Compound | Wt % | g/100 g $H_2O$ | mol/1000 mol $H_2O$ |
|---|---|---|---|
| $K_2SO_4$ | 14.3 | 20.3 | 21.0 |
| $MgSO_4$ | 9.82 | 14.0 | 20.9 |
| NaCl | 0.40 | 0.57 | 1.77 |
| $CaSO_4$ | 0.03 | 0.05 | 0.06 |

SOP crystals are formed from the concentrated SOP liquor in an MVR crystallizer system operating at about 85° C., which removes approximately 30% of the water from the concentrated SOP liquor. The SOP crystals are separated from the resulting SOP mother liquor, and are dried and granulated as desired. The concentration of the SOP mother liquor is approximately as shown in Table 4 below and as point D on the phase diagram shown in FIG. 3. The composition of the dried SOP crystals is approximately as shown in Table 5.

TABLE 4

SOP Mother Liquor Composition

| Compound | Wt % | g/100 g $H_2O$ | mol/1000 mol $H_2O$ |
|---|---|---|---|
| $K_2SO_4$ | 15.0 | 22.8 | 23.5 |
| $MgSO_4$ | 16.4 | 24.8 | 37.0 |
| NaCl | 0.55 | 0.84 | 2.59 |
| $CaSO_4$ | 0.03 | 0.05 | 0.06 |

TABLE 5

Dried SOP Composition

| Compound | Wt % |
|---|---|
| $K_2SO_4$ | 98.4 |
| $MgSO_4$ | 1.05 |
| NaCl | 0.03 |
| $CaSO_4$ | 0.20 |

Figure 4:
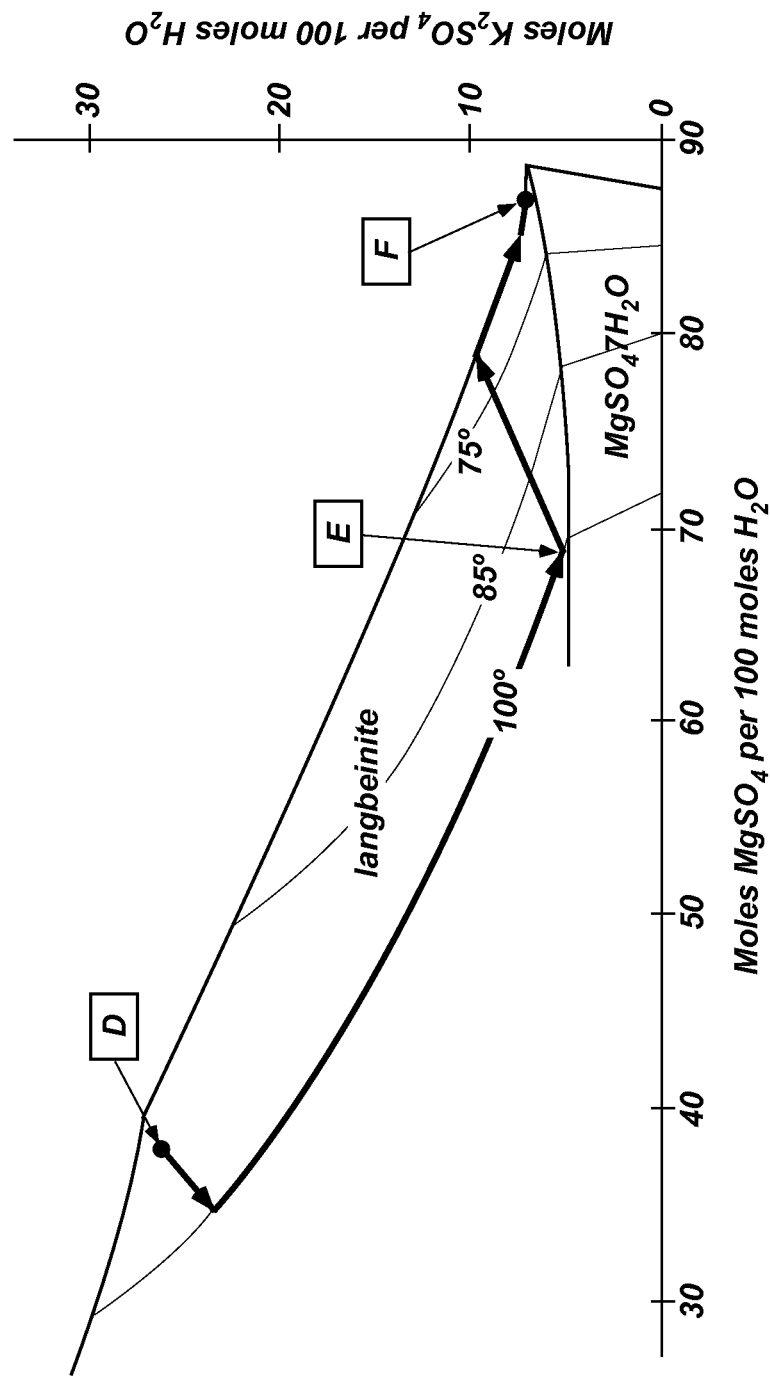

The SOP mother liquor is transferred to a second MVR crystallizer system operating at about 100° C., in which langbeinite crystallizes. The langbeinite is separated from the liquor in a centrifuge. A portion of the liquor is recycled back into the second MVR crystallizer, and a portion is purged. A portion of the langbeinite solid is dried and granulated as desired. The composition of the dried langbeinite is approximately as shown in Table 6. The composition of the liquor is difficult to locate on the phase diagram shown in FIG. 3 because the langbeinite region of the phase diagram overlaps the leonite region (i.e., langbeinite and leonite may each be in equilibrium with solutions of identical concentrations of dissolved components) Furthermore, since the isotherms in the langbeinite region are inverted with respect to the isotherms in the rest of the phase diagram, depiction of the langbeinite region on the phase diagram shown in FIG. 3 may obscure the phase boundaries. For this reason, the langbeinite region of the phase diagram is shown in FIG. 4. Point D appears on both the phase diagram of FIG. 3 and the phase diagram of FIG. 4. Without being bound to a particular theory, it is believed that the liquor follows the darkened path to point E on the phase diagram of FIG. 4. However, the crystallization of langbeinite may follow a different path on the phase diagram.

TABLE 6

Predicted Dried Langbeinite Composition

| Compound | Wt % |
|---|---|
| $K_2SO_4$ | 41.15 |
| $MgSO_4$ | 58.4 |
| NaCl | 0.31 |
| $CaSO_4$ | 0.05 |

The remainder of the langbeinite solid is transferred to an agitated tank operating at approximately 60° C. Make-up water is also added to the tank. $MgSO_4$ and $K_2SO_4$ dissolve incongruently in the water, with $MgSO_4$ preferentially leached into solution. Without being bound to a particular theory, it is believed that langbeinite dissolves while leonite crystallizes. Whatever the mechanism, some salts of the langbeinite become a part of leonite crystals. The leonite is separated from the water (which contains dissolved $MgSO_4$ and some $K_2SO_4$), shown as point F on the phase diagram shown in FIG. 4, and the solids are recycled to the dissolver. The liquor is recycled to the second MVR crystallizer.

The processing methods and systems disclosed herein may offer advantages over conventional methods and systems. For example, producing SOP as described herein may require less energy than conventional methods. Energy from one operation may be recovered for use in another operation described herein. Some systems of the present disclosure may require only two crystallizers, keeping capital and operating costs lower than in processing systems using more than two crystallizers or requiring large evaporation ponds. In some embodiments, the ratio of products may be varied based on market demand. For example, a processing system may operate such that all or nearly all of the potassium becomes SOP, while the magnesium may be purged from the system for crystallization into epsomite, kieserite, etc. The same processing system may be operated at a different time with different operating conditions, such that as little as about 50% (on a molar basis) of the available potassium becomes SOP, while the remainder, along with magnesium, becomes langbeinite. The product mix may be shifted as necessary to maximize the value of products and to maximize profits. Such flexibility may limit the economic risk of building a processing plant employing methods disclosed herein, because a decline in the price of one product may be at least partially offset by a change in the product mix.

The methods and systems disclosed herein may be used in conjunction with utilities (e.g., electricity, steam, etc.) supplied by local suppliers, and/or by cogeneration. For example, the system may be designed such that a majority of the electricity required to operate is generated by one or more power generation systems. The system may be connected to a local electrical grid; the grid may continuously supply a small amount of electricity, or may temporarily supply enough electricity to operate the system in the case of interruption of cogeneration. By sizing the cogeneration system to supply slightly less than the total operational needs, the cogeneration system may be operated at full capacity without the need to sell excess power to local utility suppliers. Yet, the utility costs may be controlled by limiting the amount of power that must be purchased. The system may also be configured to recover energy (e.g., as heat) from one portion of the process for use in another portion of the process.

A portion of the recovered potassium sulfate crystals (e.g., particulate potash) and/or langbeinite crystals may be in a fine particle size. Such fine material may be advantageously granulated or pelletized to produce larger size particles, which is generally preferred for use in triple-beam spreaders or similar spreading equipment commonly used on farms. Coarser particles generally cause less dusting and have lower losses than finer particles.

Agglomeration may be accomplished in conventional equipment, such as a pan granulator, a drum granulator, a compactor, etc. Conventional organic and/or inorganic binding agents may be introduced to form granules or pellets having a selected size, hardness, purity, etc. Particles may be agglomerated with phosphates, sulfates, silicates, fiber-based materials, polymers, starches, etc. For example, particles may be agglomerated with mono-ammonium phosphate or ammonium nitrate.

Agglomeration of products formed by the process disclosed herein may differ from agglomeration of natural mineral products (i.e., crystals produced from mining operations, without recrystallization). For example, langbeinite formed by crystallization may incorporate water molecules in conventional agglomeration processes. Without being bound to any particular theory, it is believed that recrystallized langbeinite may partially decompose on contact with water. The water may then become part of the crystalline structure by hydration. This hydration may contribute to formation of particles with desirable physical properties, but may also decrease the weight fraction of potassium in the particles (generally expressed as $K_2O$ content). To avoid this dilution of potassium content, it may be desirable to prevent or reverse water uptake by the crystalline structure.

In some embodiments, crystallized particles may be partially dehydrated in one or more stages before agglomeration. For example, particles may be heated to a temperature of about 20° C. or higher, followed a second heating to a temperature of about 90° C. or higher (which process may be referred to in the art as "curing"). Particles may, in some embodiments, be dehydrated by heating to a temperature of at least 200° C. or at least 250° C. Particles may be dehydrated after the agglomeration process, in addition to or instead of dehydration before the agglomeration process. For example, agglomerated material may be heated to a temperature of about 100° C. or higher, or to a temperature of about 250° C. or higher. In certain embodiments, a shell may be formed over agglomerated material. For example, water (e.g., a water mist, steam, etc.) may be added to an agglomerated material, and a portion of the water may become incorporated into the crystalline structure of an outermost portion of the agglomerated material. Thus, a shell of hydrated crystalline material may surround or encapsulate an inner core.

In some embodiments, other products may be recovered from various process flows. For example, a portion of the leonite produced in the decomposer 120 may be removed, dried, and granulated. As another example, some products may include mixtures or solutions, such as soluble-grade fertilizers or products separable by flotation.

An additional non-limiting example embodiment of the disclosure is described below.

A process for producing substantially pure potassium sulfate ($K_2SO_4$) from a raw polyhalite ore may include comminuting or grinding raw polyhalite ore in the presence of an aqueous media to produce wet, fine solid particles of polyhalite. The solid particles of polyhalite may be separated from the aqueous media. The solid particles of polyhalite may be calcined at a temperature of at least about 440° C., such as at least 480° C., for a sufficient period of time to convert at least a portion of the solid particles of polyhalite to a water-soluble composition including $Ca^{2+}$, $Mg^{2+}$, $K^+$, and $SO_4^{2-}$. The water-soluble composition may then be at least partially dissolved in an aqueous medium to form a solution. Potassium and magnesium sulfate may be leached from the water-soluble composition to produce an extract liquor having a $K_2SO_4$ content of at least about 6.0% by weight and a $MgSO_4$ content of at least about 4.0% by weight. Leonite may be introduced to the extract liquor to produce a concentrated solution comprising $K_2SO_4$ and $MgSO_4$. Water may be evaporated from the concentrated solution under conditions adapted to produce a first evaporate solution having $K_2SO_4$ and $MgSO_4$ concentrations higher than in the concentrated solution and to precipitate calcium-containing species in a first evaporation step. The precipitated calcium-containing species may be separated from the first evaporate solution to produce an ultra-concentrated filtrate solution comprising $K_2SO_4$ and $MgSO_4$. Sufficient water may be evaporated from the ultra-concentrated solution to produce crystals of potassium sulfate and a second evaporate solution having a reduced concentration of potassium in a second evaporation step. The crystals of potassium sulfate may be separated from the second evaporate solution to provide a substantially pure potassium-sulfate product, such as fertilizer-grade SOP. The second evaporate solution may be further processed to recover solid langbeinite, and at least a portion of the solid langbeinite may be decomposed to form the leonite. At least a portion of the crystals of potassium sulfate may be agglomerated for subsequent storage, transport, sale, and use.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents. In addition, features from one embodiment may be combined with features of another embodiment while still being encompassed within the scope of the present disclosure as contemplated by the inventors. Further, embodiments of the present disclosure have utility in the processing of various materials.

What is claimed is:

1. A method of forming potassium sulfate, comprising:
   calcining polyhalite ore particles at a temperature of at least about 440° C. to convert the polyhalite ore particles to a water-soluble composition;
   dissolving at least a portion of the water-soluble composition in an aqueous medium to form an aqueous solution comprising $K^+$, $Mg^{2+}$, and $SO_4^{2-}$ ions and a calcium-containing solid;
   separating the calcium-containing solid from the aqueous solution to form a filtrate comprising $K^+$, $Mg^{2+}$, and $SO_4^{2-}$ ions;
   dissolving a potassium-containing salt in the filtrate to increase the concentration of $K^+$ and $SO_4^{2-}$ ions to form a concentrated liquor; and
   crystallizing $K_2SO_4$ from the concentrated liquor.

2. The method of claim 1, further comprising comminuting raw polyhalite ore to form the polyhalite ore particles.

3. The method of claim 1, wherein calcining polyhalite ore particles comprises maintaining the polyhalite ore particles at a temperature from about 480° C. to about 520° C. for an average residence time of at least about 10 minutes.

4. The method of claim 1, wherein, separating the calcium-containing solid from the aqueous solution comprises forming an aqueous composition saturated or supersaturated with $Ca^{2+}$.

5. The method of claim 1, wherein dissolving at least a portion of the water-soluble composition in an aqueous medium further comprises maintaining the water-soluble composition in the aqueous medium at a temperature from about 90° C. to about 100° C. for an average residence time of at least about 30 minutes.

6. The method of claim 1, further comprising precipitating at least one calcium-containing species from the concentrated liquor before crystallizing $K_2SO_4$ from the concentrated liquor.

7. The method of claim 1, wherein crystallizing $K_2SO_4$ from the concentrated liquor comprises precipitating at least one calcium-containing species from the concentrated liquor with the $K_2SO_4$; the method further comprising separating the at least one calcium-containing species from the $K_2SO_4$.

8. The method of claim 1, wherein dissolving a potassium-containing salt in the filtrate comprises dissolving leonite in the filtrate.

9. The method of claim 8, further comprising:
   crystallizing langbeinite from the concentrated liquor; and
   decomposing at least a portion of the langbeinite to form the leonite.

10. A method of producing potassium sulfate, comprising:
    providing a calcined polyhalite ore heated at a temperature of at least 440° C. to form a water-soluble composition;
    leaching the calcined polyhalite ore to produce a liquor comprising potassium sulfate and magnesium sulfate;
    dissolving a potassium-rich salt in the liquor to increase the concentration of potassium sulfate to form a concentrated liquor; and
    crystallizing potassium sulfate from the concentrated liquor.

11. The method of claim 10, wherein providing a calcined polyhalite ore comprises heating polyhalite ore particles to a temperature of at least 480° C. to form a water-soluble composition.

12. The method of claim 11, further comprising grinding raw polyhalite ore in the presence of an aqueous NaCl brine to form the polyhalite ore particles.

13. The method of claim 12, further comprising removing at least a portion of the aqueous NaCl brine from the polyhalite ore particles.

14. The method of claim 10, wherein leaching the calcined polyhalite ore comprises selectively dissolving potassium and magnesium ions with respect to calcium ions.

15. The method of claim 10, wherein dissolving a potassium-rich salt in the liquor comprises dissolving leonite in the liquor.

16. The method of claim 15, further comprising precipitating langbeinite from the concentrated liquor.

17. The method of claim 16, further comprising:
    decomposing at least a portion of the langbeinite to form leonite;
    wherein dissolving leonite in the liquor comprises dissolving leonite recovered by decomposition of the langbeinite.

18. A method of producing potassium sulfate, comprising:
    providing a calcined polyhalite ore;
    leaching the calcined polyhalite ore to produce a liquor comprising potassium sulfate and magnesium sulfate;
    dissolving a potassium-rich salt in the liquor to increase the concentration of potassium sulfate to form a concentrated liquor;
    crystallizing potassium sulfate from the concentrated liquor; and
    agglomerating the potassium sulfate.

19. A system for processing polyhalite ore, comprising:
    a calcining apparatus structured and adapted to heat polyhalite ore particles to a temperature of at least about 440° C.;
    a countercurrent leaching apparatus structured and adapted to leach potassium sulfate and magnesium sulfate from calcined polyhalite ore to form an extract liquor;
    a first mix tank in fluid communication with the countercurrent leaching apparatus, the first mix tank structured and adapted to mix a potassium-rich salt with the extract liquor to form a concentrated liquor;
    an evaporator in fluid communication with the first mix tank, the evaporator structured and adapted to evaporate water from the concentrated liquor and remove a calcium-containing compound therefrom; and
    at least one crystallizer in fluid communication with the evaporator, the at least one crystallizer structured and adapted to precipitate at least one of potassium sulfate and langbeinite from the concentrated liquor.

20. The system of claim 19, wherein the at least one crystallizer comprises:
    a first crystallizer in fluid communication with the evaporator, the first crystallizer structured and adapted to precipitate potassium sulfate from the concentrated liquor; and
    a second crystallizer in fluid communication with the first crystallizer, the second crystallizer structured and adapted to precipitate langbeinite from the concentrated liquor.

21. The system of claim 20, further comprising a second mix tank in fluid communication with the second crystallizer and the first mix tank, the second mix tank structured and adapted to mix water with the langbeinite to form leonite.

* * * * *